Feb. 16, 1937.   W. V. D'A. RUTHERFORD ET AL   2,070,686
HELICOPTER AND ROTATING WING AIRCRAFT
Filed March 16, 1934   3 Sheets-Sheet 1
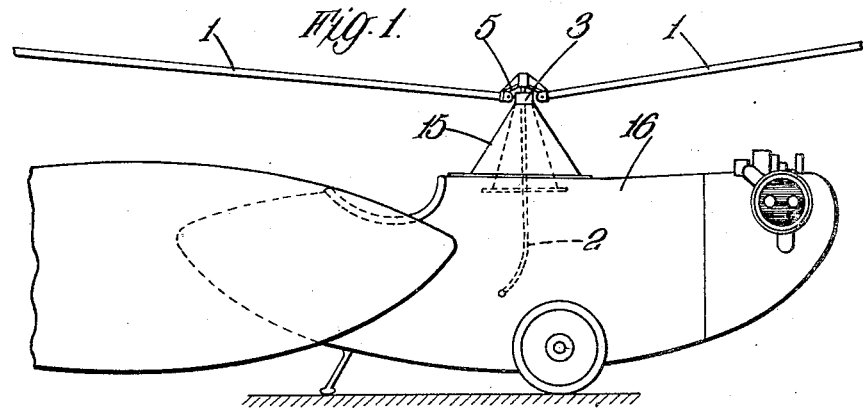
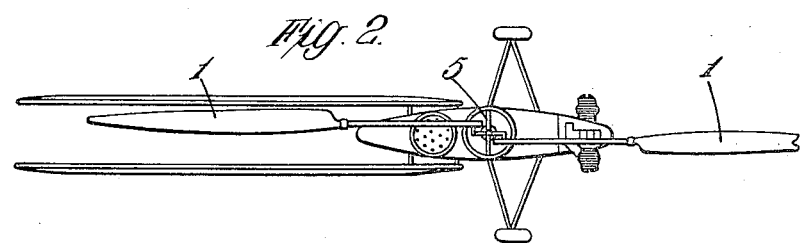
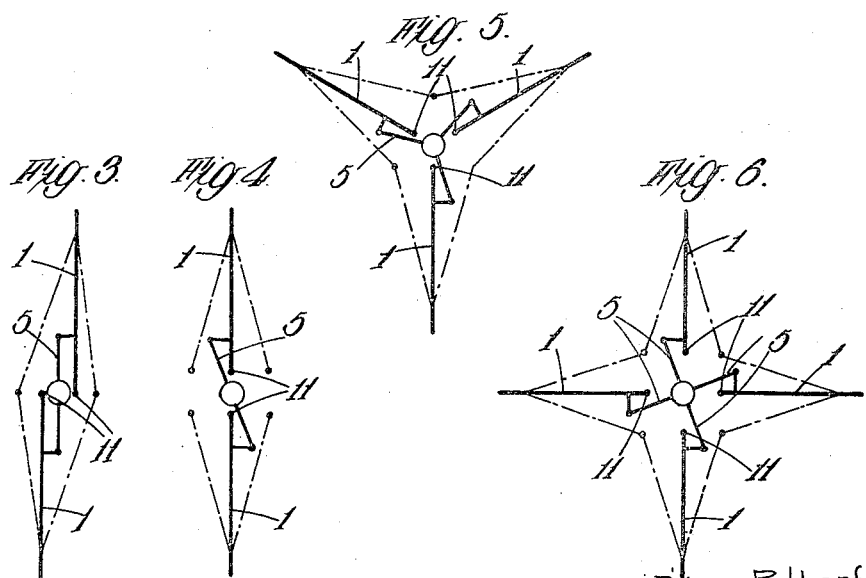
Walton Victor D'Arcy Rutherford
Raoul Hafner
Bruno Nagler
INVENTORS
By Otto Munk ATTY.

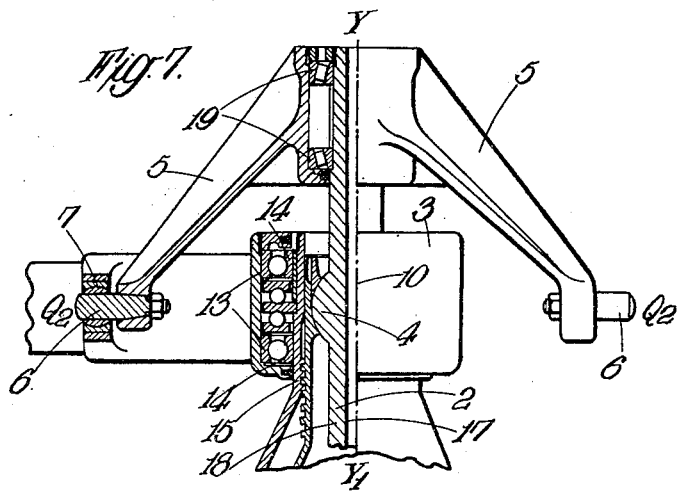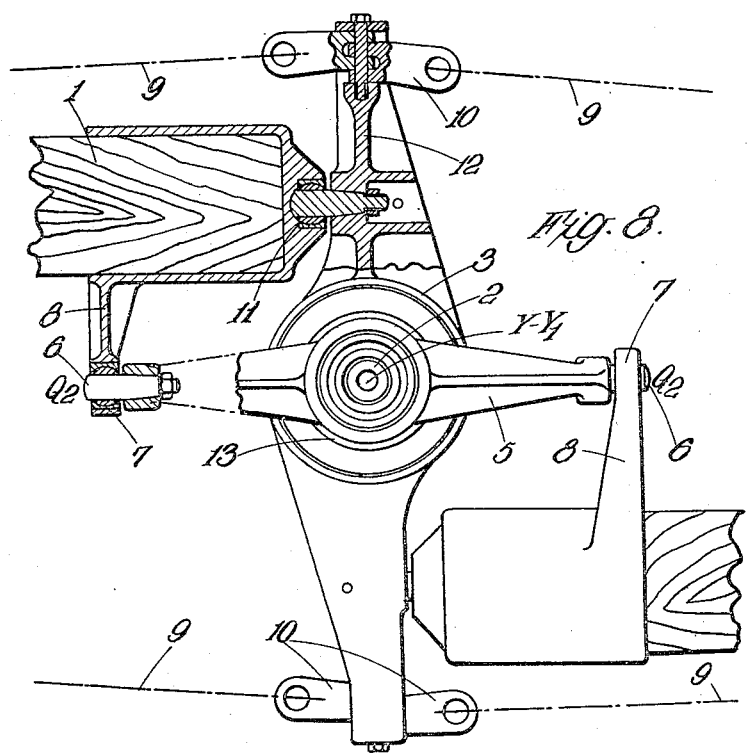

Feb. 16, 1937. W. V. D'A. RUTHERFORD ET AL 2,070,686
HELICOPTER AND ROTATING WING AIRCRAFT
Filed March 16, 1934 3 Sheets-Sheet 3
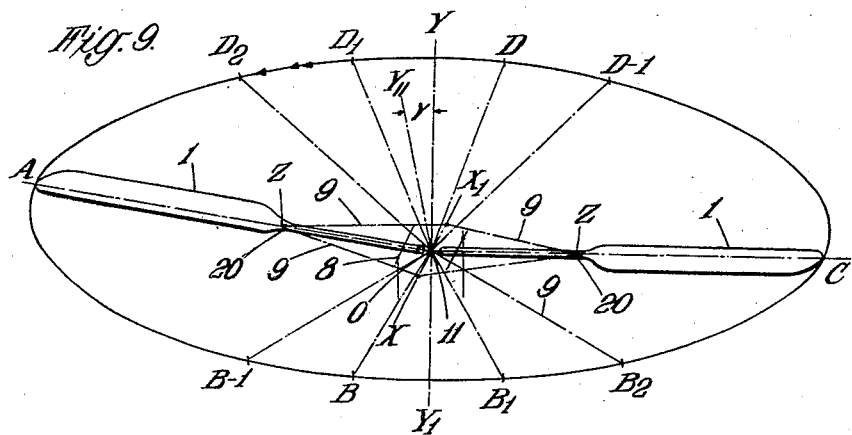
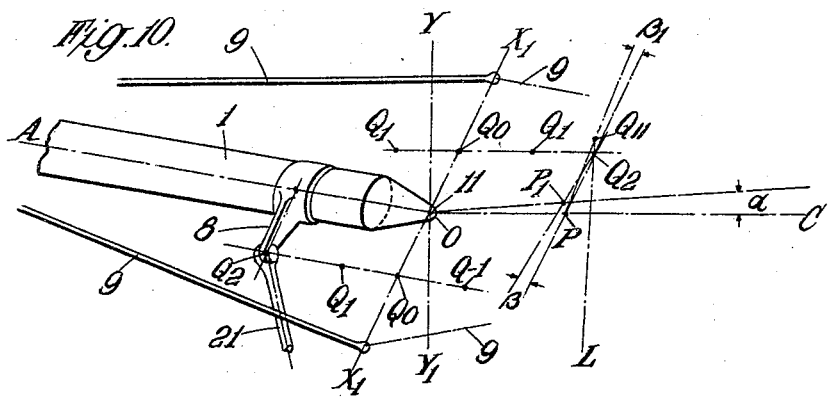
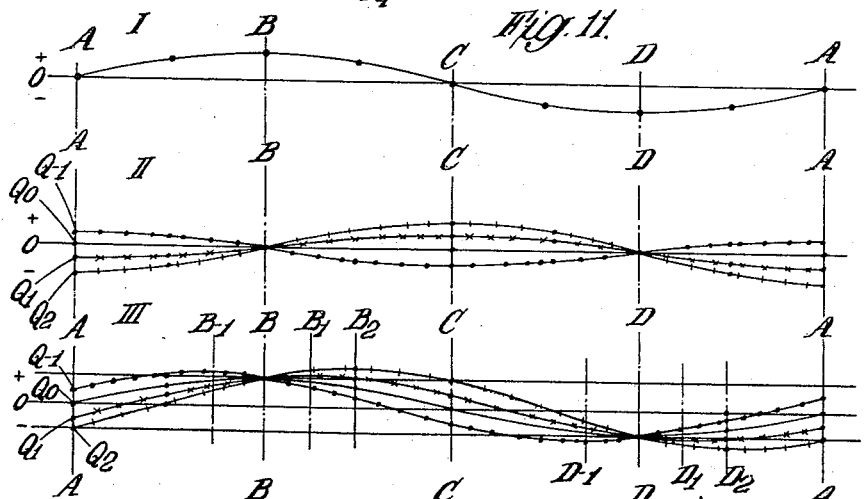
Walton Victor D'Arcy Rutherford
Raoul Hafner
Bruno Nagler
INVENTORS
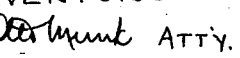 ATTY.

Patented Feb. 16, 1937

2,070,686

UNITED STATES PATENT OFFICE 2,070,686

HELICOPTER AND ROTATING WING AIRCRAFT

Walton Victor D'Arcy Rutherford, London, England, and Raoul Hafner and Bruno Nagler, Vienna, Austria Application March 16, 1934, Serial No. 715,839½
In Great Britain March 21, 1933

11 Claims. (Cl. 244—17)

This invention relates to helicopter and rotating wing aircraft.

Rotary wing aircraft, that is, aircraft having supporting surfaces rotating around a vertical axis, hereinafter called "windmill planes", have been stabilized by allowing the blades to "flap" or rock about their roots thereby introducing vertical components into their motion which in effect vary the "attitude" or angle of incidence of the blades on opposite sides of the axis of rotation and obviate an upsetting or cross torque upon the machine as a whole. The blades, however, owing to their inertia, lag behind or get out of phase with the natural path for perfect balance and, in fact, overswing at the ends of the stroke, thus unnecessarily increasing the head resistance or drag of the machine.

In the case of helicopter aircraft such as that set forth in British Patent No. 385,101, control has been obtained by mounting the individual blades of the lifting screw so that they are rotatable about their individual axes, and as a whole, as well as during their rotation, can be given varying angles of incidence or setting whereby the lifting action can be varied as a whole as well as made different at different points of the circle of revolution, the points in the said circle of greatest or smallest angle of incidence being variable at will, but maintaining their position, at the same time relative to a neutral position of the control, and thus relative also, to the structure or fuselage in the event of the rotor axis becoming tilted during lateral flight.

The stability of such helicopter aircraft is limited by gyroscopic action and by a comparatively small increase of blade angle, namely, the angle between the normal angle of the blade and its stalling angle. The gyroscopic action, due to angular change of the direction of the axis of rotation of the windmill, causes an upsetting couple to act in a plane at right angles to the plane of angular motion. This couple is very strong when the direction of the axis of rotation is quickly changed and makes landing on one wheel difficult and prevents quick manoeuvre in flight.

The primary objects of this invention are to increase the stability and manoeuvrability of helicopter machines, to improve the controllability of rotary wing aircraft, to reduce the drag on the said aircraft and to enable helicopter machines to be transformed instantly at will into rotary wing aircraft and vice-versa.

According to this invention helicopter and rotary wing aircraft are provided with means allowing the blades to rock or flap up and down transversely to their plane of rotation combined with means for varying the angles of incidence or setting of the blades. Means may be provided operated by the said "flapping" motion for varying the angles of incidence or setting of the blades according to the amplitude of the "flapping" motion, so that the lifting action is made different at different points of the circle of revolution both by the "flapping" motion and by the change of the angle of incidence of the blades, whereby the amplitude of the "flapping" motion necessary to secure stability is decreased.

Means may also be provided for controlling the inclination of the blades either as a whole or individually from point to point.

Means may further be provided for bracing the blades so that centrifugal force will reduce the pressure on the roots of the blades and enable them to be angularly adjustable without friction.

The invention is described with reference to the accompanying drawings wherein:—

Figure 1 is a side view.
Figure 2 is a plan.
Figures 3, 4, 5 and 6 are diagrammatic representations of various dispositions with two, three, or four bladed machines.
Figure 7 is a cross section of a detail of the control mechanism.
Figure 8 is a partial sectional plan of Figure 7.
Figure 9 is a functional diagram.
Figure 10 is a plan thereof.
Figure 11 shows various graphs of movement.

In one example showing how to carry the invention into effect a helicopter machine has the individual blades 1 of the lifting screw rotatably mounted about their individual axes A, O. A control column 2 is universally mounted at the centre of the windmill unit 3 by means of a ball joint 4 and has rotatably mounted thereon a spider member 5 connected by suitable joints 6, 7 to radius rods 8 on the said blades 1 for controlling or reversing their angles of incidence or setting as a whole, as well as individually during their rotation. Each blade 1 is braced intermediate its ends against lateral and centrifugal force by a triangular bracing 9 which is pivoted by links 10 on approximately the same axis as the root 11 of the blades, to a frame 12 carried by one of the rings 13 of a ball race, the other ring 14 of which is rigidly secured to a hollow tubular portion 15 connected to the aircraft body 16. The first mentioned ring 13 is driven by the engine in any suitable way and carries the necessary structure and bracing such as 9 to support the blades 1 both at rest and in flight.

The blades 1 are normally set at a dihedral angle to each other and free to take up a position in which centrifugal force balances the lift.

The means for varying or reversing the angle of incidence or setting of the blades either as a whole or individually during their rotation comprises a tubular member 17, provided with an external square thread 18 co-axial with the axis Y,Y' of the windmill unit and capable of bodily adjustment in the axial direction by rotating it within a corresponding screw thread in the fixed member 15 and a control column 2 capable of tilting adjustment relatively to the said axis by means of the ball joint 4 carried on the end of the axially adjustable member 17. The spider 5 is rotatably mounted upon the end of the column 2 by means of a ball race 19. The distance of the radius rods 8 from the roots 11 is determined by the desired ratio between amplitude of flap to change of angle of incidence. If a large change of the angle of incidence is required with a small amplitude of flap, the radius rod 8 is placed at a greater distance from the root 11 than it would be if a smaller change of angle of incidence is required for the same amplitude of flap. The length of the said radius rods 8 is determined by the sensitiveness of control desired, the sensitiveness in fact, varying inversely as the length of the said rods, since the longer the rod the smaller the change of the angle of incidence for a given tilting movement of the ball race. Any suitable means may be provided for adjusting the length of the radius rods or altering their position relative to the roots of the blades.

The machine may be provided with a tractor screw to adapt it for use as either a helicopter or rotary wing aircraft.

The action of this machine is as follows:—

With the tractor screw stationary the blades 1 are placed in gear with the engine and driven at the required speed. The centrifugal force acting on the blades tensions the bracing, leaving the roots of the blades free from friction so that the blades may be readily turned on their longitudinal axes. The inclination of the blades is increased as a whole by the control mechanism until the machine lifts as a helicopter. When at the desired height, transverse motion or lateral flight may be obtained either by inclining the axis of the rotary wings in the direction of motion or by throwing the tractor screw into gear. In both cases stability is maintained by the wings flapping and simultaneously altering their angle of incidence in the manner previously and subsequently described. In the latter case the inclination of the wings as a whole may be reduced as the speed of translation is increased and the power required to drive the wings is thereby reduced. Simultaneously the axis of rotation is inclined backwards. When the speed of translation is sufficiently great the wings may be given a negative inclination so as to drive the wings without the engine, which may then be thrown out of gear with the rotary wings and the machine flown entirely and landed as a rotary wing aircraft. Alternatively the above procedure may be reversed and the machine landed vertically under its own power as a helicopter.

The combined effect of flapping blades with positive control is as follows:—

In the accompanying Figures 9, 10 and 11, the plane of rotation is shown as A B C D A and the blades revolve in the direction, A B C D A.

Each blade 1 is suspended on two points, O and Z and braced against lateral and centrifugal forces by cables 9 triangularly arranged so that the cables and the blade are in each case in one plane, and so that the centrifugal force of the rotating blade leaves it free to be moved easily round its own axis, A,O or O,C and so that the point O, is in or near the rotor axis Y,Yi, and the other point Z at a suitable distance along the blade. Thus the blade 1 may flap round the axis X,Xi, which also contains the point O, and is at the same time movable round its own axis A,O or O,C by means of radius rods 8 fixed near the root 11 of the blades 1 and connected to the control mechanism through levers 21 or spider members 5.

It is possible in construction to vary the position of the point of attachment of the control of the radius rods 8 to say Qo, Q—i, Qi, Q2, and to fix a position for it that has the best aerodynamical result. Since this point is connected to the control system as previously described or as set forth in British Patent No. 385,101, it is possible to move it at will, by means of the control, round the blade axis A,O, or O,C so that the angle of incidence of the blade is variable, e. g. from negative through zero to positive and vice versa, and to move all the blades together in this sense: or the said point may be given a different position at different phases of the rotor revolution to alter the angle of incidence of any one blade during any revolution so that any desired component of lift, with its counter-balancing opposite effect, may be introduced in any ideal point in the rotor circumference without altering the position of the rotor axis Y,O, Yi.

If it is first assumed that the length of the radius rod 8 is kept constant while it is moved to positions Q—i, Qo, Qi, Q2 and that the point of its attachment to the control system is fixed to revolve with it and that the angle of incidence of all the rotating blades has a certain consistent value, which is positive, in all instances then:—

When the position of the point of attachment Qo, lies in the axis X,O Xi, the angle of incidence of the blade 1 is fixed relative to the structure, and the angle of attack varies only with the effect of lateral motion upon the revolving flapping blade, or varies when the rotor axis becomes tilted by any inclination of the structure.

Were the blades to revolve about a vertical axis without flapping, the angles of incidence, relative to the structure, and the angles of attack, relative to the air, would be identical. When the flap is introduced, and the blade moves upward with a certain upward speed and there is a certain consistent speed of revolution of the rotor, the angle of attack decreases to a new value and vice versa when the blades moves downward.

If the point of attachment is moved out of the axis XO, Xi, the angle of incidence is influenced in the following manner: in the upward flap, in the case of the position Q—i, it increases, in the positions Qi, and Q2, it decreases; thus the angle of attack increases or decreases according to the distance in a negative or positive sense of the point of attachment from the axis X,O Xi.

When the axis of the fixed rotating structure becomes tilted relative to the axis Y,O Yi of the blades through gyroscopic action or inertia delaying the blades from following any aerodynamical movement of the fuselage or structure, to the amount of gamma degrees in the plane Y C Yi A O, and the said axis of the fixed rotating structure takes up a new position, Y$t_i$ O: and when the point of attachment Q$o$ lies in the axis, X,O X$i$ then the angle of attack of the blade is constant at the points A and C on the rotor circumference, but at the point B it increases and at the point D decreases, with the result that there is an upward lift at B, and a corresponding downward influence at D, but at A and C there is no alteration of lift in either direction. See Figure 11, curve I. When however the point of attachment is moved out of the axis X, O X$i$, an additional effect is introduced, caused by an alteration of the angle of incidence of the blade at the points A and C on the rotor circumference, but not affecting the points B and D, the amount of the additional effect varying according to the distance of the point of attachment from the point O, negatively or positively, (see Figure 11, Curve II). The combined effect is shown in the Figure 11, Curve III and it is seen that a higher factor of stability appears, and also the point of maximum lift may be established according to the position of the point of attachment relative to the point O, at points on the rotor circumference other than B, say B—$i$, B$i$ and B2, with the corresponding downward balance at D—$i$, D$i$ and D2. Introducing now control, when the axis Y,O Y$i$ is tilted by means of the control, in the case of the point of attachment Q$o$, which is in fact a system of flapping blades connected to the rotor by a universal joint, in order to effect a desired downward lift, for instance at the point A in the rotor circumference with an upward lift at C, it must be started at D and B, with D downward and B upward: the influence at D and B will be slightly delayed owing to the inertia of the rotor, with the result that the eventual gyroscopic translation of the effect will become stabilized in the neighbourhood of A and C.

In the case of other positions of the point of attachment, the control causes an immediate alteration of the angles of incidence at the desired point in the rotor circumference only very slightly affected by the inertia of the rotor, and any lag tends to become corrected back in a reverse direction to the desired point of influence. This also tends to counteract the gyroscopic effect above mentioned so that the influence of the control is fixed and maintained at the desired points in the rotor circumference.

The position of the point of attachment in Figure 10 has reference to the alterations of angles of incidence and of attack, of the blades by means of the control, when the point of attachment lies outside the axis, X,O X$i$ and the point P$_1$ has reference to the similar alterations caused by flapping through an angle $\alpha$.

It may be pointed out that the de la Cierva windmill machine has a fixed angle of incidence of the blades relative to the fuselage, which is a negative angle of —2 degrees, and obtains the positive adjustment of the blades out of forward speed and a backward tilt of the rotor axis, in the run for taking off and during flight.

In starting from a standstill there is a limit to the useful amount of the rotor revolutions obtainable from the engine before throwing the tractor screw into gear, since the force exerted in a downward lift or pressure, until the effect of lateral motion alters the flap of the blade so that there is a positive angle of attack. A certain "run" is thus essential to this type of machine.

If, on the other hand, the angles of incidence are variable at will, the rotor revolutions may be obtained at an angle zero or slightly positive, and if for instance the normal revolutions in flight are 160, revolutions up to say 240 may be obtained before throwing the tractor screw into gear, when the machine will be immediately airborne and a steep angle of climb be possible until the rotor revolutions return to normal and the backward tilt of the rotor is given with a negative angle of incidence to the blades for maintaining the revolutions during lateral flight. No "run" is necessary. Similarly in landing the inertia of the rotor and a change of the angle of incidence of the blades will combine to check the speed of falling when the tractor screw is throttled back, and a perpendicular landing is possible and normal.

Thus, in taking off and in landing the inertia of the rotor is used in conjunction with the variability of the angles of incidence of the blades to create a temporary helicopter effect, though in lateral motion the rotor is tilted backwards and the blades kept at a negative angle as in the la Cierva windmill.

In another example of construction according to the invention a rotary wing machine provided with the usual flapping blades 1 and tractor screw and rudder and elevator control has the blades mounted in any suitable way so as to be capable of altering their angle of incidence.

The blades, braced as previously described so as to be turnable without friction are provided with short radius rods 8 near their roots or flapping axes connected to a fixed portion of the rotating structure so that as the blades flap the inclination is varied as previously described. It will be appreciated that such a flapping rotary wing machine will obtain stability with a smaller flapping amplitude, and consequently with less loss due to head resistance due to overswinging of the blades caused by their inertia than in the case of machines which do not automatically vary the inclination or set of the blades. It will also be understood that such a rotary wing machine may be provided with control means previously described for enabling the angles of incidence to be varied as a whole as well as independently from point to point during their rotation, so as to introduce a factor of lift at any ideal point in the rotor circumference without the provision of means for enabling it to be transformed into a helicopter machine.

It will further be understood that a lost motion device of any suitable kind may be embodied in the mechanism for varying the angles of incidence or setting of the blades, so that the blades may be allowed to flap a certain amount without altering the said angle of incidence on either the upper or lower part of the stroke or without increasing the angle of incidence on the lower part of the stroke while decreasing the angle of incidence on the upper part of the stroke.

Helicopters and rotary wing aircraft according to this invention may be provided with two, three or more blades braced and pivoted as shown diagrammatically in plan in Figures 3, 4, 5 and 6.

We claim:—

1. In a rotary wing aircraft having means for rotating the wings and simultaneously flapping them, a pair of flexible stays each of which has one of its ends connected to a wing at a point intermediate its ends and has its other end connected to a part of the rotating wing structure in such manner that the stay is always in the same plane as the longitudinal axis of the wing and the other stay, each of the stays forming the hypotenuse of a triangle of which the longitudinal axis of the wing is one side, whereby friction at the root of the wing caused by lateral and centrifugal forces is eliminated.

2. In a rotary wing aircraft including a rotating hub having radiating blades and oppositely extending arms, each of said blades attached to the rotating hub structure by a flapping joint mounted on one of said arms, means brought into operation by the flapping of the blades for varying the angle of incidence of the blades during their rotation, and flexible, inextensible bracing means secured at one end to said blades, one in front and one behind each of said blades and connected, at the other end, respectively, to the outer extremities of said arms, and substantially in a straight line passing through said blade joint.

3. In a rotary wing aircraft including a rotating hub having radiating blades and oppositely extending arms, each of said blades attached to the rotating hub structure by a flapping joint mounted on one of said arms, and flexible, inextensible bracing means secured at one end to said blades, one in front and one behind each of said blades and connected at the other end, respectively, to the outer extremities of said arms.

4. In a rotary wing aircraft including a rotating hub having radiating blades and oppositely extending arms, each of said blades attached to the rotating hub structure by a flapping joint mounted on one of said arms, means brought into operation by the flapping of the blades for varying the angle of incidence of the blades during their rotation, said means comprising a radius rod having one end rigidly attached to the wing in such a manner that the rotation of said rod about its transverse axis causes rotation of the wing about its longitudinal axis and having its other end pivotally mounted on a non-rocking portion of the rotating wing structure, and flexible, inextensible bracing means secured at one end to said blades, one in front and one behind each of said blades and connected at the other end, respectively, to the outer extremities of said arms.

5. In a rotary wing aircraft including a rotating hub having radiating blades and oppositely extending arms, each of said blades attached to the rotating hub structure by a flapping joint mounted on one of said arms, means brought into operation by the flapping of the blades for varying the angle of incidence of the blades during their rotation, separate means for simultaneously changing the angle of incidence of all of the blades, and flexible, inextensible bracing means secured at one end to said blades, one in front and one behind each of said blades and connected at the other end, respectively, to the outer extremities of said arms.

6. In a rotary wing aircraft having a rotating hub structure and a plurality of variable-pitch flapping wings radiating from said rotating structure and secured thereto by a flapping joint, torsionally flexible and inextensible bracing means positively secured to each of said wings and anchoring the same to said rotating structure, said bracing means being secured to the rotating structure substantially in a line passing through the flapping joint and carrying the entire centrifugal load of said wings in flight, whereby frictional restraint on pitch changes of said wings is substantially eliminated.

7. In a rotary wing aircraft having means for rotating the wings and simultaneously flapping them, in combination, a central rotating head, a wing having its root universally mounted in said head, a laterally projecting arm fixed on said wing and intermediate its ends, a central wing supporting member, a universal connection between said member and the free end of said lateral arm whereby flapping of said wing with respect to said member causes rotation of said lateral arm about a transverse axis and consequent rotation of said wing about its longitudinal axis, and flexible, inextensible bracing means comprising a pair of flexible stays each of which has one of its ends connected to a wing at a point intermediate its ends and has its other end connected to a part of the rotating wing structure in such a manner that the stay is always in the same plane as the longitudinal axis of the wing and the other stay, each of the stays forming the hypotenuse of a triangle of which the longitudinal axis of the wing is one side, whereby friction at the root of the wing caused by lateral and centrifugal force is eliminated.

8. In a rotary wing aircraft having means for rotating the wings and simultaneously flapping them, in combination, a central rotating head, a wing having its root universally mounted in said head, a laterally projecting arm fixed on said wing and intermediate its ends, a central wing supporting member, a universal connection between said member and the free end of said lateral arm whereby flapping of said wings with respect to said member causes rotation of said lateral arm about a transverse axis and consequent rotation of said wing about its longitudinal axis, and flexible, inextensible bracing means connecting each wing to points spaced on the central rotating head and substantially on the flapping axis, the central wing-supporting member being universally supported so as to be tiltable at will to simultaneously vary the angles of incidence of all the wings through the agency of its universal connection with the lateral arms on each of said wings.

9. In a rotary wing aircraft having means for rotating the wings and simultaneously flapping them, in combination, a central rotating head, a wing having its root universally mounted in said head, a laterally projecting arm fixed on said wing and intermediate its ends, a central wing-supporting member, a universal connection between said member and the free end of said lateral arm whereby flapping of said wing with respect to said member causes rotation of said lateral arm about a transverse axis and consequent rotation of said wing about its longitudinal axis, and flexible, inextensible bracing means connecting each wing to points spaced on the central rotating head and substantially on the flapping axis, said central wing-supporting member being universally mounted so as to be tiltable at will to simultaneously vary the angles of incidence of all of the wings through the agency of its universal connection with the lateral arms on each of the blades and in which the universal mounting of said central wing-supporting member has a control handle extending therefrom into the space occupied by the operator of the aircraft.

10. In a rotary wing aircraft having wings attached to a rotating structure by a flapping joint, a pair of flexible, inextensible bracing stays connected at one end to each wing at a point intermediate its ends, the other ends thereof being connected to points spaced on the rotating structure, and lying substantially on the flapping axis in such a manner that each stay is always in the same plane as the longitudinal axis of the wing and the other stay, each of the stays forming the hypotenuse of a triangle of which the longitudinal axis of the wing is one side, whereby friction at the root of the wing caused by lateral and centrifugal forces is eliminated.

11. In a rotary wing aircraft having a rotating hub structure and a plurality of variable-pitch flapping wings radiating therefrom and secured thereto by a flapping joint, torsionally flexible and inextensible bracing means positively secured to each of said wings and anchoring the same to said rotating structure and carrying the entire centrifugal load produced by said wings due to rotation in flight, said bracing means being so secured in relation to said wings that the restraining force of said bracing means is directly opposed to the centrifugal force at the point of attachment to said wings.

WALTON VICTOR D'ARCY RUTHERFORD.
RAOUL HAFNER.
BRUNO NAGLER.